Figure 1:
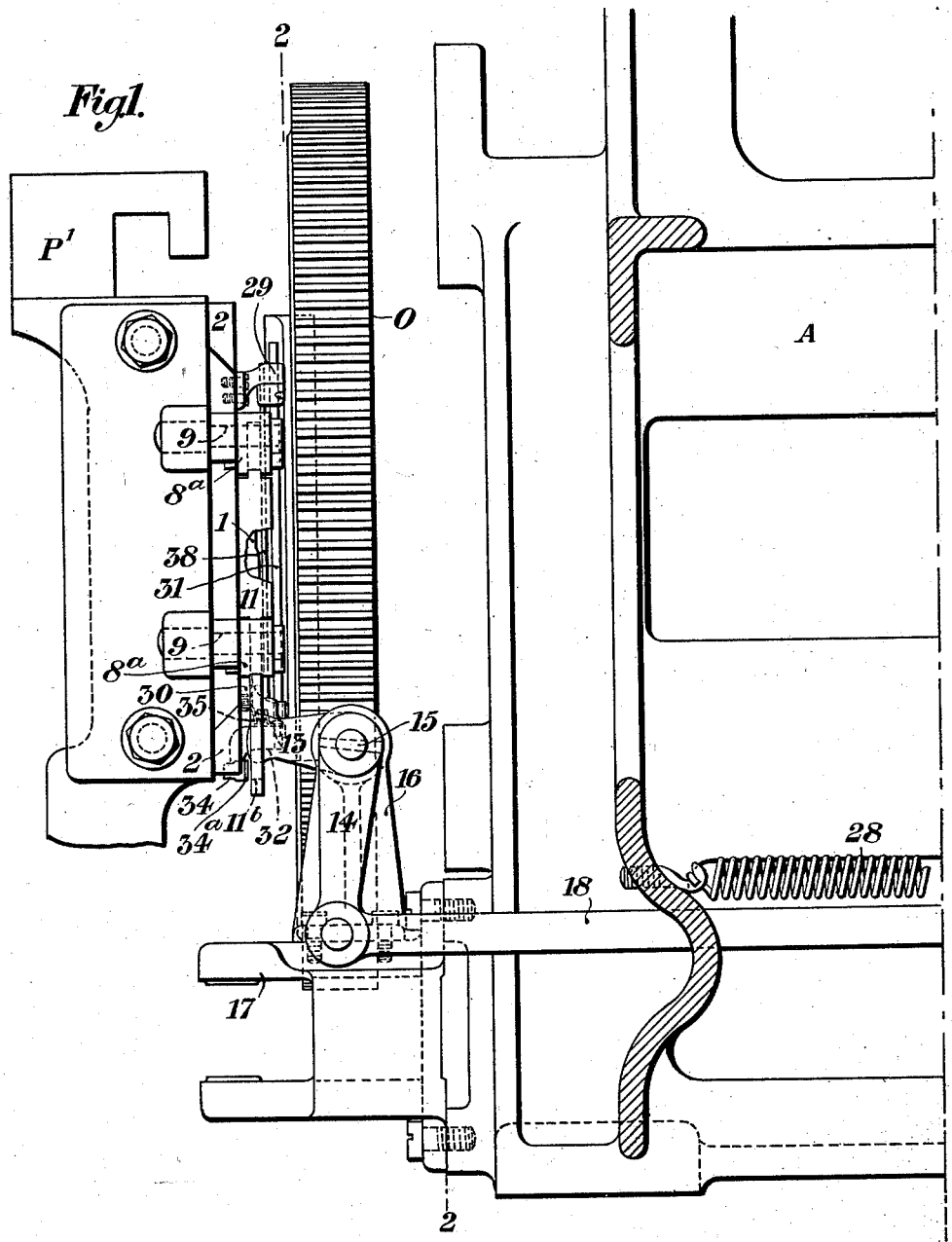

No. 705,801. Patented July 29, 1902.
F. J. WICH.
TRIMMING MECHANISM FOR LINOTYPE MACHINES.
(Application filed Apr. 11, 1902.)
(No Model.) 5 Sheets—Sheet 1.

Witnesses. Inventor

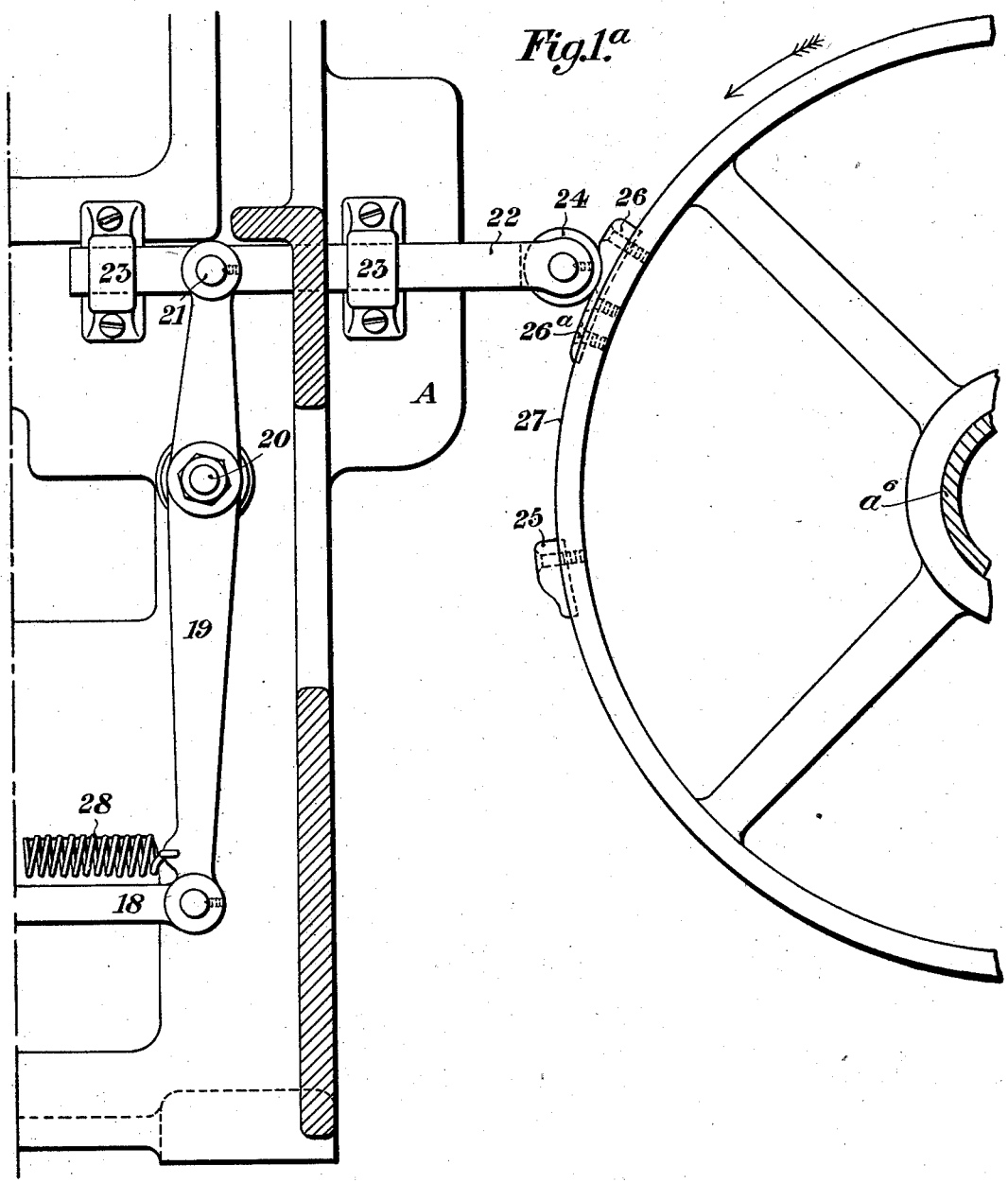

No. 705,801. Patented July 29, 1902.
F. J. WICH.
TRIMMING MECHANISM FOR LINOTYPE MACHINES.
(Application filed Apr. 11, 1902.)
(No Model.) 5 Sheets—Sheet 3.

Witnesses.
Inventor
F. J. Wich
per
Attorney

No. 705,801. Patented July 29, 1902.
F. J. WICH.
TRIMMING MECHANISM FOR LINOTYPE MACHINES.
(Application filed Apr. 11, 1902.)
(No Model.) 5 Sheets—Sheet 4.
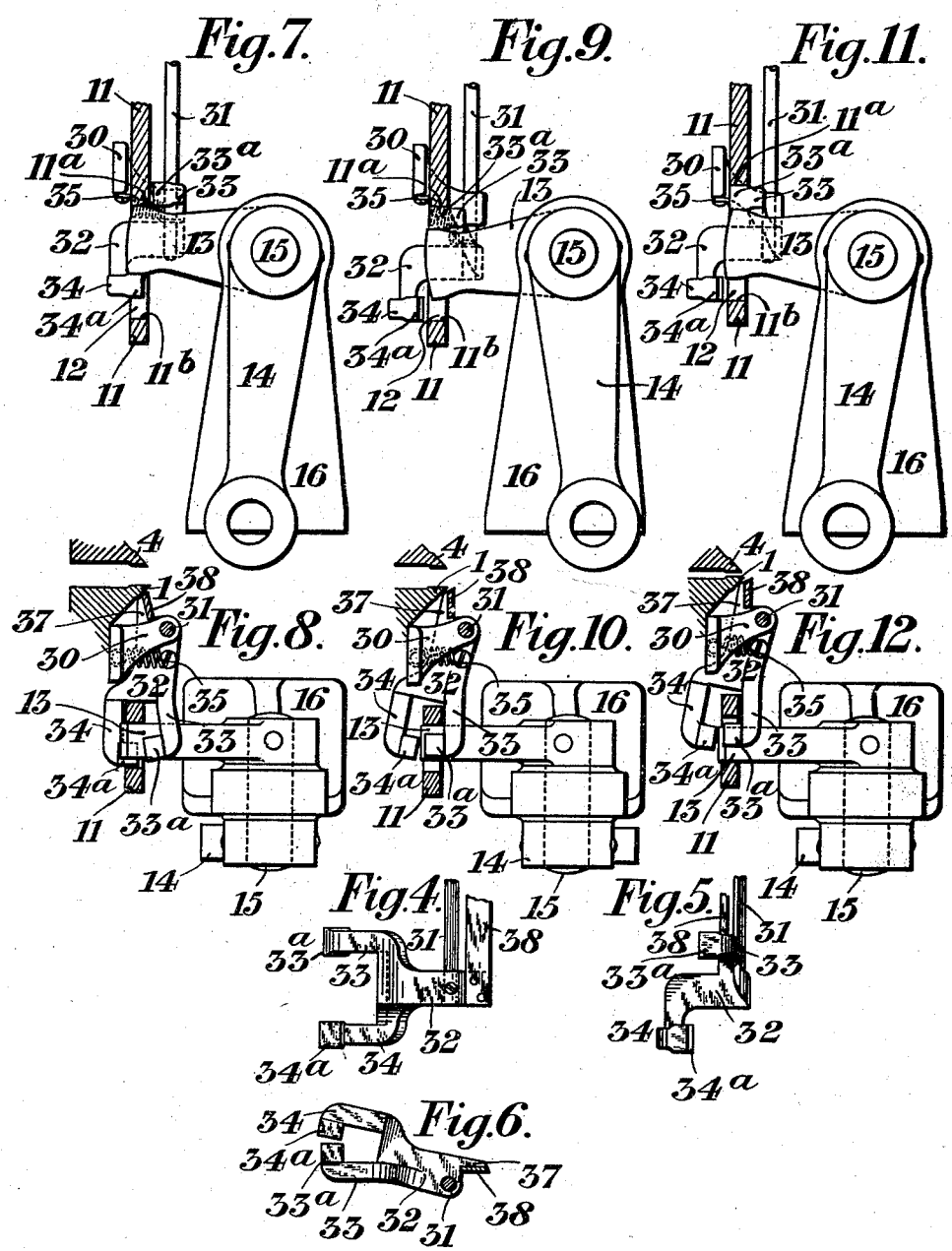
Witnesses.
Inventor
F. J. Wich
per P. T. Dodge
Attorney No. 705,801. Patented July 29, 1902.
F. J. WICH.
TRIMMING MECHANISM FOR LINOTYPE MACHINES.
(Application filed Apr. 11, 1902.)
(No Model.) 5 Sheets—Sheet 5.
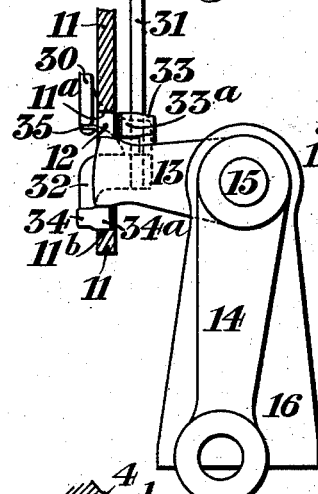
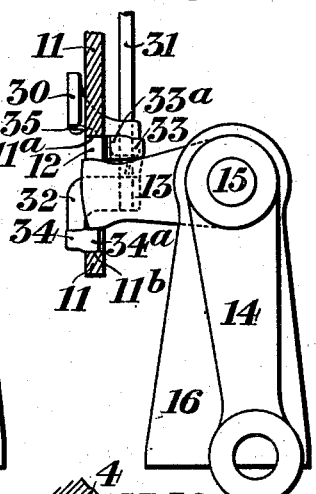
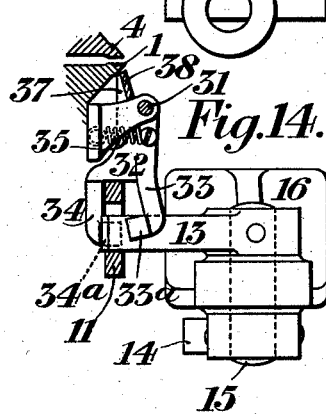
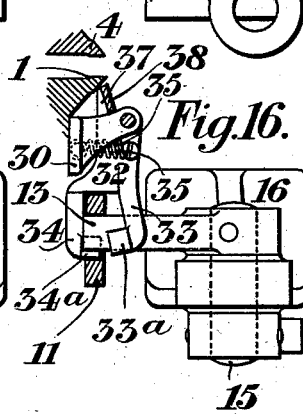
Witnesses.
Inventor
F. J. Wich
per P. T. Dodge
Attorney

UNITED STATES PATENT OFFICE.

FERDINAND JOHN WICH, OF ALTRINGHAM, ENGLAND.

TRIMMING MECHANISM FOR LINOTYPE-MACHINES.

SPECIFICATION forming part of Letters Patent No. 705,801, dated July 29, 1902.

Application filed April 11, 1902. Serial No. 102,418. (No model.)

*To all whom it may concern:*

Be it known that I, FERDINAND JOHN WICH, residing at The Poplars, Barrington road, Altringham, in the county of Chester, England, have invented certain new and useful Improvements in Trimming Mechanism for Linotype-Machines, of which the following is a true, full, and clear description, such as will enable others skilled in the art to which it appertains to make and use the same.

The present invention relates to improvements in connection with the trimming mechanism of linotype-machines, and particularly trimming mechanism arranged so that when ordinary linotypes are produced the two knives are held at the normal distance apart and when linotypes having one or more two-line or other overhanging capitals are produced the said overhang automatically effects the lateral backward movement of that knife which is on the side corresponding to that of the overhang, so as to place the said knife beyond the reach of the overhang when the linotype is passed between the two knives.

This invention may be considered an improvement on that described in Letters Patent No. 635,830, issued to me on the 31st day of October, 1899, in which the overhanging letters on the linotype were relied upon to impart motion to and throw out of action the parts holding the knife forward in operative position, in consequence of which the ear or projection on the linotype was subjected to severe strains tending to fracture or mutilate it. The present invention has in view the avoidance of these strains and the adjustment of the knife by power-driven devices subject to governing or controlling devices, easy in action, which are in turn controlled by the overhanging letter or ear on the linotype.

The invention will be best understood by reference to the accompanying drawings, which are to be taken as part of this specification and read therewith, and wherein the said invention as an example is shown applied to a Mergenthaler linotype-machine of the construction described in the specification of Letters Patent No. 436,532.

Figure 2:
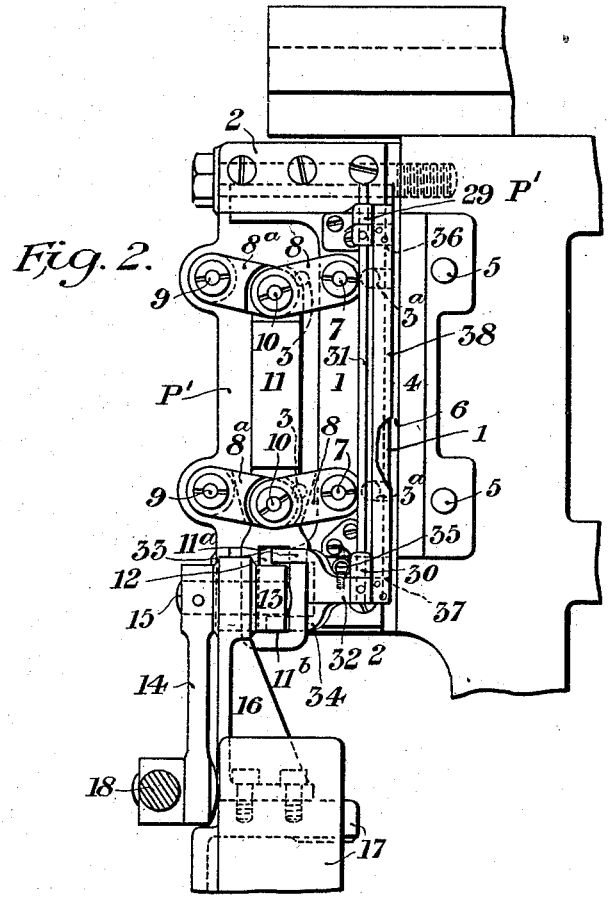
Figure 3:
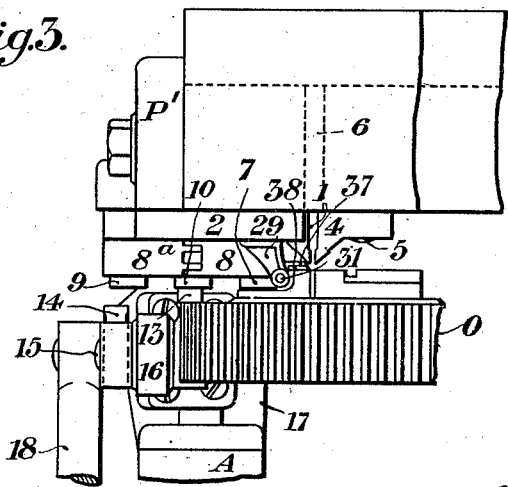

Figures 1 and 1$^a$ are two parts of the same vertical section, divided at the dotted lines shown at the right and left of those figures, respectively, of part of a linotype-machine provided with the present improvements, the said section being such as would be seen from the right-hand side of the machine. Fig. 2 is a sectional view on the line 2 2 of Fig. 1, looking toward the left of that figure, with the mold-wheel removed; Fig. 3, a plan of Fig. 2, showing a portion of the mold-wheel; Fig. 4, a rear elevation; Fig. 5, an elevation as seen from the right of the machine, and Fig. 6 a plan of the fork detached from the machine; Fig. 7, a sectional right-hand side elevation; and Fig. 8, a sectional plan, showing certain operative parts of the mechanism. Figs. 9 and 10, 11 and 12, 13 and 14, and 15 and 16 are views, respectively, similar to Figs. 7 and 8, but showing the same parts in different operative positions.

A represents a portion of the rigid main frame of the machine. $a^6$ is the cam-shaft, which rotates in bearings in or near the back of the machine in the direction indicated by the arrow in Fig. 1$^a$; O, the mold-wheel, adapted intermittently to rotate through two hundred and seventy degrees and ninety degrees, and P' the "vise-frame or "knife-block," as it is hereinafter called.

All the parts just enumerated are substantially as described in the before-mentioned specification, No. 436,532, the same letters of reference being used to identify them in both specifications.

The before-mentioned movable knife 1 is mounted in dovetail or undercut guides 2 2, secured to the rear side of the knife-block P', and it is laterally movable in these guides, so that it may be brought nearer to or farther from the fixed knife 4, which is rigidly secured to the knife-block P' by bolts 5 5, the extreme outward and inward movements of this knife being determined by stops 3 3 and 3$^a$ 3$^a$, respectively, which stops are fixed to the knife-block P', as shown in dotted lines in Fig. 2. 6 is the ejection-port, traversing the knife-block P' from back to front and through which the linotypes pass after leaving the knives 1 4, the said knives being situated one on either side of the port 6 and the port being of such width as to admit of the free passage therethrough of a linotype having display or capital letters overhanging the body of the linotype to the maximum extent.

The movable knife 1 is pivoted by studs 7 7 to the free ends of toggle-links 8 8, whose companion links 8ᵃ 8ᵃ at their tied or stationary ends are pivoted by studs 9 9 to the knife-block P'. The respective sets of toggle-links 8 8ᵃ 8 8ᵃ are pivoted together by bolts 10 10, which serve also to pivot these toggle-links to a vertical link 11, provided near its lower end with two abutments 11ᵃ 11ᵇ. These abutments may form the top and bottom of a preferably rectangular hole 12, as shown in Fig. 2, or of a recess extending more or less across the link 11. When the link 11 is raised, it causes the toggles to advance the movable knife 1 toward the fixed knife 4 until the distance between them corresponds to the thickness of the ordinary linotype without an overhanging letter. On the contrary, when the link 11 is lowered it causes the toggles to draw the movable knife 1 away from the fixed knife 4 until the space between them is such as to permit the passage of a linotype with an overhanging letter thereon. The movement of the link is effected by the following means:

Situated between the abutments 11ᵃ 11ᵇ of the link without filling the space between them is the free end of the approximately horizontal arm 13 of a bell-crank lever 13 14, the approximately vertical arm 14 of which is connected to the arm 13 by a short shaft 15. This short shaft 15 is pivoted in a bracket 16, rigidly secured to the usual starting-handle bracket 17. The lower end of the lever-arm 14 is pivotally connected to one end of a link 18, whose opposite end is similarly connected to the lower end of a vertical lever 19. This lever is pivoted by a stud 20 to the fixed framing A of the machine, and at its upper end it is pivoted by a stud 21 to a horizontal push-rod 22. The push-rod 22 is free to slide in two guides 23 23, secured to the frame A, and in its rearward end is journaled an antifriction-roller 24, which is successively acted upon by two cam-pieces 25 26, fixed to, preferably, the usual delivery and space-bar-shifter cam 27, secured on the before-mentioned cam-shaft $a^6$. To the lower end of the lever 19 is attached the rear end of a tension-spring 28, which is also attached at its forward end to the fixed frame A, and therefore has a constant tendency to raise the before-mentioned lever-arm 13, said spring acting in opposition to the cams 25 26. Of these latter, which are separated from each other by about an eighth of a circle, the cam 26, unlike 25, has at its leading end a low level surface 26ᵃ for a purpose hereinafter described. Each of the cams 25 26 engages the push-rod 22 once during each rotation of the cam-shaft $a^6$.

To the rear of the movable knife 1 are secured two bearings 29 30, in which is mounted with a capacity for both rotary and vertical movement a vertical rod 31, on the lower end of which is secured the stem of a fork 32, through which motion is imparted from the lever 13 to the knife-adjusting link 11. This fork, as shown most clearly in Figs. 4, 5, and 6, has two prongs 33 34, situated in different vertical and horizontal planes, the prong 33 being above the lever-arm 13 and at the rear of the link 11 and the prong 34 being below the lever-arm 13 and in front of the link 11. Each of the prongs 33 34 is provided with a projection 33ᵃ and 34ᵃ, respectively, the former (33ᵃ) adapted to be inserted between the upper side of the lever-arm 13 and the abutment 11ᵃ, (the projection 34ᵃ at that time being in its inoperative position,) and the latter (34ᵃ) adapted to be inserted between the under side of the lever-arm 13 and the abutment 11ᵇ, while the projection 33ᵃ occupies its inoperative position. The projections 33ᵃ and 34ᵃ are simply filling pieces or blocks to reduce the opening in the link 11 above or below the actuating-lever 13, so that the lever will communicate motion to the link through that filling-piece which is for the time being in operative position. To the under side of the bearing 30 is secured the front end of a tension-spring 35, whose rear end is secured to the fork 32, so that the said spring exerts a constant tendency to draw the fork-prongs 33 34 forward and also tends to hold the fork in its highest position, determined by the said fork abutting against the bearing 30. By reference to Figs. 7 to 16, inclusive, which represent all the different vertical and lateral positions of adjustment of the fork 32, it will be seen that at all times there is either one or other of the projections 33ᵃ 34ᵃ situated between the abutments 11ᵃ 11ᵇ and above or below the lever-arm 13.

Near the upper end of the vertical pivot-rod 31 is secured an arm 36, which, conjointly with an arm 37 extending from the fork 32, rigidly carries a vertical horizontally-swinging plate 38, situated in the path followed by any overhang there may be on the linotypes when the said linotypes are moved toward the trimming-knives 1 4. This yielding plate 38, acted upon by the overhang of the linotypes, controls the position of the filling-pieces through which the lever-arm 13 acts on the knife-adjusting devices, or, in other words, the plate 38 controls the mechanism through which the knives are separated and approximated, as hereinafter more fully described.

The relative dimensions of the depth of the lever-arm 13, the stroke of said arm, the distance between the abutments 11ᵃ 11ᵇ, and the depth of the projections 33ᵃ 34ᵃ are important. The distance between 11ᵃ and 11ᵇ is equal to the depth of the lever-arm 13 plus twice the length of the rise or fall or stroke of the said arm, and the depth of each of the projections is equal to that rise or fall. There is thus a clear space between the abutment 11ᵃ and the upper side of the arm 13 when the projection 34ᵃ is inserted between the under side of the said arm and the abutment 11ᵇ and in contact with both, and correspondingly a clear space between the abutment 11ᵇ and the under side of the arm 13 when the projection 33ª is inserted between the upper side of the arm and the abutment 11ª and in contact with both, the height of the said clear space in either case being equal to the depth of either of the projections 33ª 34ª.

When the machine is casting ordinary linotypes, the projection 33ª occupies its operative position between the abutment 11ª and the upper side of the arm 13, as shown in Figs. 9 and 10. The resistance to lateral movement of the knife 1 in the guides 2 2 is such as will cause the link 11 to be maintained in its highest position and the knives 1 4 consequently at the minimum distance apart when the lever-arm 13 descends and the fork projection 34ª is in the inoperative position. (Indicated in Figs. 11 and 12.)

It is to be observed that the operation of trimming the linotype takes place after the cam 26 has left and before the cam 25 reaches the antifriction-roller 24, so that in the case of ordinary linotypes the full pressure of the spring 28 is constantly applied to maintain the movable knife 1 in its proper trimming position.

When an overhung linotype has been cast, the next ensuing forward movement of the mold-wheel O into the ejecting position causes the overhang or overhangs to bear against the vertical plate 38, and thereby turn the pivot-rod 31 about its axis and swing the fork 32 rearward, so as to insert the projection 34ª between the arm 13 and the abutment 11ᵇ and render the projection 33ª for the time being ineffective by removing it from between the arm 13 and abutment 11ª. Figs. 13 and 14 represent these devices at this condition of adjustment. The low level cam portion 26ª at the last-named juncture is in engagement with the antifriction-roller 24, as shown in Fig. 1ª, and serves to relieve the fork projections 33ª of the pressure which the spring 28 exerts upon it through the lever-arm 13, and thereby allows the fork 32 to be freely moved under the pressure of the linotype overhang. The high level cam portion 26 next engages the push-rod 22 and through the lever 19 and link 18 rocks the lever-arm 13 down, the said arm, through the fork projection 34ª and abutment 11ᵇ, serving to lower the vertical link 11, and thereby, through the toggles 8 8ª, withdrawing the movable knife 1 away from the fixed knife 4. This condition of adjustment is best indicated in Figs. 15 and 16. The linotype is then ejected in the usual way, the overhang part or parts moving clear of the then withdrawn knife 1. When the cam 26 has passed away from the push-rod 22, the spring 28 immediately thereafter rocks the lever-arm 13 up; but as there is a vacant space between the upper surface of the arm 13 and the abutment 11ª this upward movement of the said arm has no effect on the vertical link 11 or movable knife 1, which latter therefore remains standing at the maximum distance from the stationary knife 4. Figs. 7 and 8 represent the devices at this stage of the working. At the next cycle of the machine the leading cam 25 again engages the push-rod 22 and effects the lowering of the lever-arm 13 and at the same time depresses the fork 32, because the fork projection 34ª is then beneath the arm 13. As soon as the arm 13 reaches the bottom of its stroke the space between it and the abutment 11ª is equal to the height of the projection 33ª, and the spring 35 immediately draws forward the fork 32, so as to insert said projection between the upper side of the arm 13 and the proximate abutment 11ª, the projection 34ª being simultaneously withdrawn from beneath the arm 13, and thereby for the time being rendered inoperative. Figs. 9 and 10 show the devices in this condition of adjustment. When the leading cam-piece 25 has released the push-rod 22, the spring 28 rocks the lever-arm 13 upward, and this, through the projection 33ª then inserted between it and the abutment 11ª, effects the raising of the link 11 and moves the knife 1 toward the fixed knife 4. Figs. 11 and 12 show the positions which the devices occupy at the termination of this upward movement of the lever-arm 13.

It will be readily understood that instead of the arm 13 having a curvilinear motion imparted to it it may partake of a rectilinear vibrating motion, the term "vibrating arm" hereinafter employed in the claims being intended to include all such equivalent devices.

It is to be observed that in my mechanism the adjustment of the knife is mechanically effected by a portion of the power applied to drive the machine and that the action of the knife-adjusting mechanism is controlled by the overhang on the slug acting upon the controlling device, which offers but slight resistance, so that there is no danger of mutilating the linotype or interfering with its passage through the machine.

I believe it to be broadly new to employ devices acted upon by the projection on the linotype to couple up or control the action of power-driven devices for adjusting the knife.

I claim—

1. In a linotype-machine the combination with the knife-block, a trimming-knife laterally movable thereon, an arm adapted to move the knife laterally, and a plurality of cams adapted to operate the arm at each cycle of the machine, of a fork pivotally mounted on the knife-block, the two prongs of the fork being situated in different planes, one on either side of the arm, a member in operative connection with the fork situated in the path of, and adapted to be operated by, overhung letters on the linotype to insert one fork-prong into operative connection with the arm and movable knife and render the second prong ineffective, and a spring for inserting the second prong into operative connection with the movable knife and rendering the first one ineffective substantially as set forth.

2. In a linotype-machine the combination with the knife-block and a trimming-knife laterally movable thereon, and toggles pivoted to the knife-block and movable knife, of a link pivotally connected to the toggles, abutments on the link, a vibrating arm between the abutments, a fork pivotally mounted on the knife-block, its two prongs being situated in different planes one on either side of the arm, a member in operative connection with the fork situated in the path of, and adapted to be operated by, overhung letters on the linotype to insert one prong between the arm and the proximate abutment and render the second arm ineffective substantially as set forth.

3. In a linotype-machine the combination with the knife-block and a trimming-knife laterally movable thereon, and toggles pivoted to the knife-block and movable knife, of a link pivotally connected to the toggles, abutments on the link, a vibrating arm between the abutments, a fork pivotally mounted on the knife-block, its two prongs being situated in different planes and one on either side of the arm, a member in operative connection with the fork, situated in the path of, and adapted to be operated by, overhung letters on the linotype to insert one of the prongs between one side of the arm and the proximate abutment and a spring connected to the knife-block and fork for inserting the other of the prongs between the other side of the arm and the second abutment substantially as set forth.

4. In a linotype-machine the combination with the laterally-movable knife, a link in operative connection with the knife and a vibrating arm operating the link, of bearings on the knife, a rod axially and angularly movable in the bearings, a fork rigid on the rod, the prongs of which are situated in different planes and one on either side of the vibrating arm, a plate rigid with the fork and at the opposite side of the axis of oscillation, and in the path of overhangs on the linotypes, and projections on the fork-prongs for insertion between the arm and link substantially as set forth.

5. In a linotype-machine, a knife movable toward and from its companion, power-driven mechanism for effecting the adjustment of the knife, and a controlling device for said mechanism, arranged to be acted upon by a projection on an outgoing linotype.

6. In a linotype-machine, a knife, adjustable transversely to its length, an independently-movable device for imparting motion to the knife, an intermediate movable member for connecting and disconnecting said parts, and a device for adjusting said member adapted to be acted upon by projections on the linotypes.

7. In a linotype, a knife, power-driven mechanism for adjusting the knife, and intermediate controlling devices arranged to be operated by the linotypes.

8. In a linotype-machine, a knife adjustable in a direction transverse to its length, a controlling device to be acted upon by the passing linotypes, and intermediate mechanism through which the controlling device determines the adjustment of the knife.

9. In a linotype-machine, a trimming-knife movable transversely, spring connections tending to advance the knife toward the path of the linotypes, positively-acting mechanism to retract the knife, and a device acted upon by the passing linotype to cause the action or non-action of the retracting mechanism.

10. In a linotype-machine, a transversely-adjustable knife, power-driven mechanism for effecting the adjustment, and a controlling device for said mechanism extending the entire length of the path traversed by the linotype, whereby a projection or overhang at any point in the length of the linotype will effect the adjustment of the knife.

In testimony that I claim the foregoing as my invention I have hereunto signed my name in the presence of two subscribing witnesses.

FERDINAND JOHN WICH.

Witnesses:
GEORGE ERNEST BANNISTER,
HAROLD WORSLEY.